May 12, 1970     H. P. HOBBS, JR     3,511,159
CAMERA AND LENS SUPPORT
Filed Sept. 14, 1966
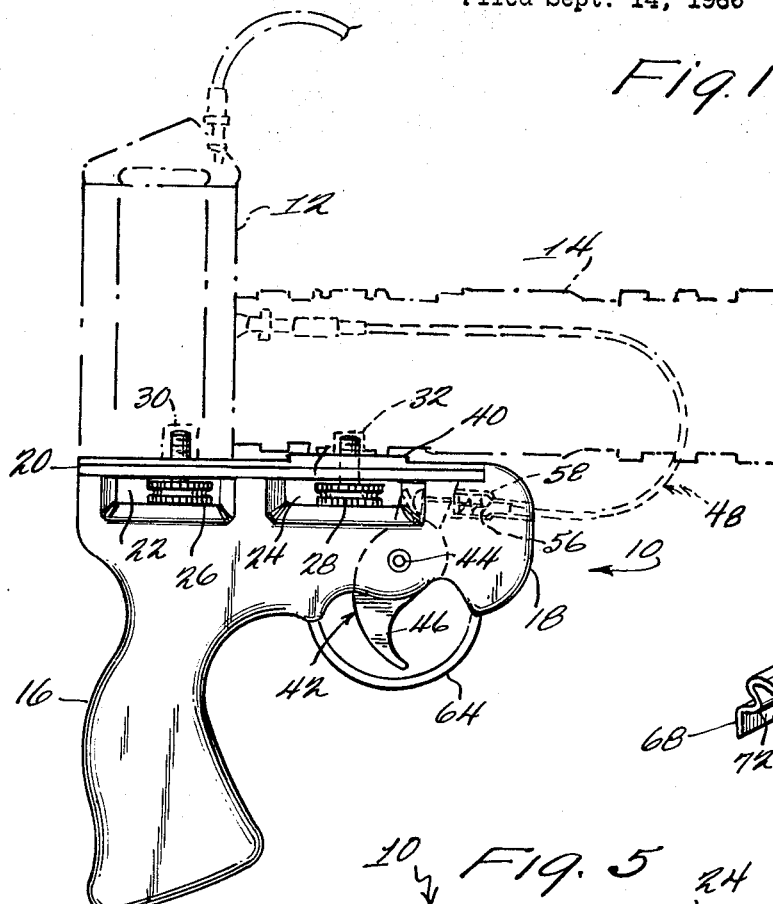
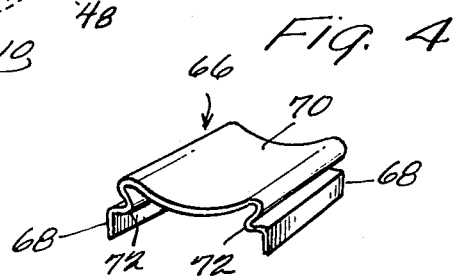
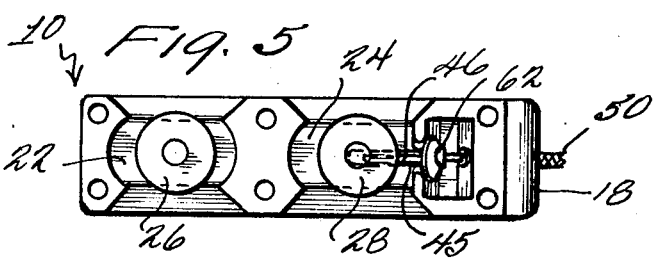
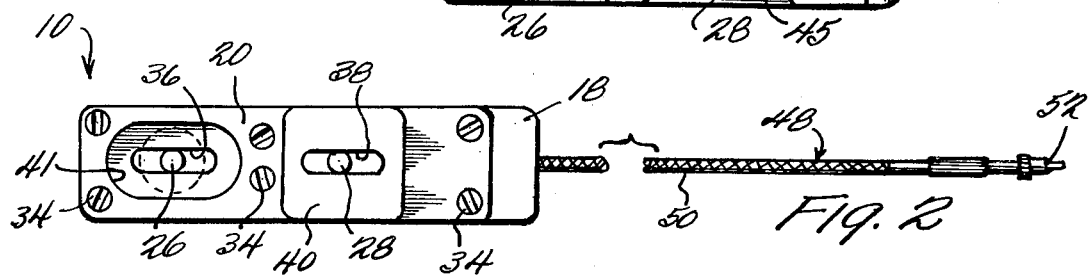
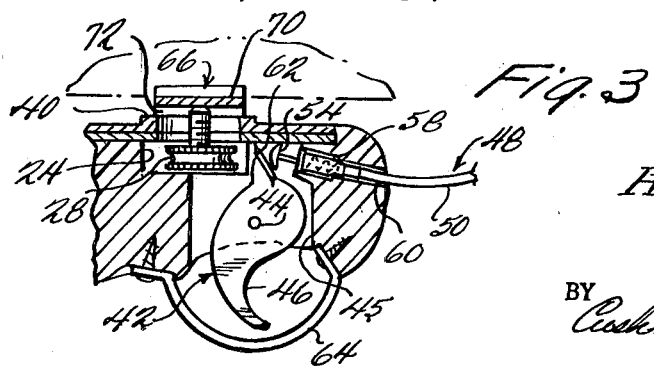
INVENTOR
HORACE P. HOBBS, JR.
BY Cushman, Darby & Cushman
ATTORNEYS

United States Patent Office 3,511,159
Patented May 12, 1970

3,511,159
CAMERA AND LENS SUPPORT
Horace P. Hobbs, Jr., 2719 36th Place NW.,
Washington, D.C. 20007
Filed Sept. 14, 1966, Ser. No. 579,347
Int. Cl. G03b 17/12
U.S. Cl. 95—86                               5 Claims

ABSTRACT OF THE DISCLOSURE

A camera and lens support including a stock fitting beneath a camera, and a pistol-grip handle depending from the stock. The camera and lens are detachably mounted upon the stock by means of separate thumb screws carried in the stock. A trigger associated with the stock actuates the camera shutter.

---

This invention relates to a camera support adapted to be held in one hand for aiming the camera and for actuating the shutter. In particular, it relates to a support which provides a rigid mounting for the camera and for a lens projecting from the camera, such as a telephoto lens.

Many telephoto lenses of moderate focal length, about 135 mm. to about 350 mm., are light enough and short enough to be used without a tripod for supporting the camera-lens combination. As an aid in holding and manipulating the still somewhat cumbersome camera-lens combination pistol grip supports have been suggested. These supports help to steady and aim the instrument, and in addition they leave one of the operator's hands free to adjust the focus and aperture. Typically, the pistol grip is designed to support the combination from below, and to this end it is provided with a single thumb screw adapted to be screwed into the conventional socket in the bottom of the camera or into the tripod socket which is often provided in the barrel of the telephone lens.

One of the objects of the present invention is to provide an improved pistol grip support for a camera-lens combination which is directly attached to both the camera and lens, thereby imparting greater rigidity to the assembly and thereby preventing strain and possible pivotal movement of the parts as the assembly is handled. In prior pistol grip supports only one thumb screw is employed to attach a camera-lens combination to the support, and even when the screw is highly tightened some swinging movement may occur during handling. In addition, strain on the camera-lens combination occurs as a result of the torque produced by the weight of the lens or by the weight of the camera, depending on which part is attached to the support. These disadvantages are overcome by the present pistol grip support by providing a platform on which the barrel of the lens rests and by providing separate mounting screws for the camera and for the lens. The barrels of many telephoto lenses are manufactured with a threaded socket for receiving the mounting stud on a tripod, and the presence of this socket is taken advantage of by the present pistol grip. A detachable clamp is provided for use when the lens barrel does not have a socket, the clamp being releasably connectable to the support and shaped to engage the lens barrel from below and from the sides.

It is another object to provide a pistol grip support of the above-described type which is simple and economical to manufacture owing to the simplicity of certain of the parts and to the use of certain other parts which are standard pieces of camera equipment.

The invention will be further understood from the following detailed description taken with the drawing in which:

FIG. 1 is a side elevational view of a pistol grip support embodying the principles of the present invention;
FIG. 2 is a top plan view of the support;
FIG. 3 is a fragmentary vertical sectional view illustrating the use of the support with a lens having no tripod socket;
FIG. 4 is a perspective view of the lens-supporting clip of FIG. 3; and
FIG. 5 is a top plan view of the support with the mounting plate removed.

Referring to FIGS. 1 and 2, there is shown a pistol grip support 10 embodying the principles of the present invention together with a conventional 35 mm. camera 12 fitted with a telephoto lens 14. The body of the pistol grip support 10 is a unitary member including a handle 16 adapted to be grasped with one hand and a stock portion 18 extending forwardly from the handle 16. As shown, the handle 16 and stock portion 18 are integrally constructed of wood which has been carved to the appropriate shape, but they may be constructed of metal or synthetic material and they may be made up of different parts suitably connected together. When constructed of metal, the stock portion 18 may be a framework, and the handle 16 may be hollow in order to reduce the weight. If plastic is employed, it will generally be desirable to mold the entire body as a single piece. The shape of the handle 16 is merely that of any conventional pistol grip and is not limited to the particular contours which are shown. The shape of the stock portion 18 is not critical except that in combination with the mounting means it must provide support for both the camera 12 and the telephoto lens 14, and provide space for the trigger and shutter release mechanism.

The means for mounting a camera and lens combination on the handle and stock portion includes a mounting plate 20 which overlies two spaced apart upwardly and laterally facing cavities 22, 24 in the top of the stock portion 18. Conveniently, the mounting plate 20 is secured to the stock portion 18 with screws 34. The upper surface of the mounting plate 20 should be coated with a thin layer of non-skid material, such as rubber, to provide firm, vibration-free, non-skid contact between the plate 20 and the bottoms of the camera and lens. The rear cavity 22 contains the enlarged head of a camera mounting screw 26 the shank of which extends upwardly through a slot 36 for engagement with a threaded socket 30 in the bottom of the camera 12. The forward cavity 24 contains the enlarged head of a lens mounting screw 28 the shank of which extends through a slot 38 for engagement with a threaded socket 32 in the barrel of the lens 14.

As shown, the cavities 22, 24 have been carved out of the wood from which the handle 16 and stock portion 18 are made, but in other types of construction they may be defined by frame members or other structure. In any event the cavities 22, 24 are spaced apart along the length of the stock portion 18 a distance such that the screws 26, 28 can be aligned with the sockets 30, 32. As will be understood, the sockets 30, 32 are conventionally provided for attaching, respectively, the camera 12 and the lens 14 to a tripod. The socket in the camera is also conventionally employed to receive a case screw for holding the camera in its case.

The arrangement of the screws 26, 28 and the cavities 22, 24 contributes to the rigidity and compactness of the support 10 and makes it adaptable to a variety of camera-lens combinations. As seen in FIG. 5, wherein the mounting plate 20 has been removed, both ends of the rear cavity and the rear end of the forward cavity 24 are recessed to permit the head of the respective mounting screw to move a greater distance than would be permitted by the lateral opening of the cavity. Also, the floors of the cavities 22, 24, while being horizontal along their longitudinal center portions, are inclined downwardly and outwardly for easy access to the heads of the screws 26, 28. In some cases a single elongated cavity and a single slot in the mounting plate 20 may be provided to cooperate with both screws 26, 28, but the two-cavity arrangement will generally be found to provide a more rigid arrangement. As will be understood, the cavity or cavities and the slot or slots in the mounting plate are of sufficient length to permit longitudinal adjustment of the screws to allow for differences in the distance between the mounting socket 30 in the camera 12 and the tripod socket 32 in the lens barrel 14 in different camera-lens combinations. Adjustment of the screws 26, 28 also allows for differences in the thickness of cameras, front-to-back, so that the back of the camera can be flush with the rear end of the mounting plate 20. Preferably the depth of the cavities 22, 24 and the thickness of the mounting plate 20 are such that ordinary camera case screws may be employed as the mounting screws 26, 28.

In practice it will be found that the threaded sockets in different camera-lens combinations will be vertically offset from each other by different amounts. This results either from differences in the diameter of the barrel of the lens or from the presence of a protrusion on the bottom of the camera, the mounting socket being provided in the protrusion. To avoid creating a strain on the connection between the camera and the lens when the screws 26, 28 are tightened, it is desirable that both the bottom of the camera and the bottom of the lens barrel rest on fixed portions of the support plate 20. In the illustrated embodiment the socket 32 in the barrel of the lens 14 is slightly above the socket 30 in the camera 12, and there is provided a fixed platform 40 of such thickness that its upper surface engages the lens barrel. The platform 40 is shown as being an integral, thickened portion of the mounting plate 20, but it may be a separate piece secured in place in any convenient manner. Generally the platform, if one is needed, should be disposed at or near the location of the forward screw 28 so as to avoid the creation of bending forces on the lens barrel when the screw 28 is tightened. In some camera-lens combinations the socket in the camera may be at a higher level than the socket in the lens barrel, and in this case, a platform will be provided at the location of the rear screw 26.

It will be seen that the mounting plate 20 is of substantial width so that it will engage a significant area on the bottom of a camera. If the bottom of the camera has a downward protrusion in which the threaded socket is provided and if the mounting plate 20 is flat, only the end of the protrusion will contact the mounting plate 20. To assure that the bottom of the camera will engage the plate 20, the upper surface of the latter is provided with a shallow recess 41 of sufficient depth to receive the protrusion. If a platform is disposed at this location, as discussed above, the recess 41 will be provided in the upper surface of the platform.

It will be appreciated that the mounting plate 20 may be constructed, as shown, as a unitary or integral piece of predetermined contour so as to fit a particular camera-lens combination. Alternatively, the plate 20 may be constructed in a uniform shape and subsequently adapted to different camera-lens combination by adding the platform 40 to the plate where necessary.

A shutter actuating trigger 42 is pivotally mounted by means of a transverse bolt 44 in a slot 45 in the stock portion 18 at a location forward of the handle 16. The trigger 42 is conveniently of one-piece construction having a finger portion 46 of any suitable shape which is compatible with the shape of the handle 16 and stock portion 18. The upper end of the trigger above the pivot bolt cooperaties with one end of a conventional shutter release cable 48 of the type having a flexible sheath 50, a flexible core 52 and a plunger 54 for moving the core 52 axially of the sheath 50 in a shutter actuating direction. Preferably the cable 48 is also of the type having an internal return spring 56 for returning the core 52 and plunger 54 to their rest positions. As shown, the plunger end of the cable 48 has an enlarged end which is loosely fitted into a rearwardly facing socket 58 within the stock portion 18, and the remainder of the cable 48 passes through a passage 60 and out the front of the stock portion 18. The upper end of the trigger 42 is provided with a small plate 62 which engages and depresses the plunger 54 when the finger portion 46 is pulled by the operator. The plate 62 may be constructed integrally with the remainder of the trigger, or it may be a separate part attached to the remainder of the trigger. Preferably the socket 58, plate 62 and the enlarged upper portion of the slot 45 are so arranged that, after removing the mounting plate 40, the cable 48 can be removed by being pushed rearwardly and upwardly through the passage 60, socket 58 and slot 45.

A trigger guard 64 may be provided to prevent accidental operation of the trigger 42. The guard 64 may be a separate piece, as shown, or it may be constructed integrally with the stock portion 18.

Some telephoto lenses are not equipped with a tripod socket with the result that the front mounting screw 28 cannot be employed to support the lens. However, the present pistol grip support 10 is provided with a detachable lens clip 66 (FIGS. 3 and 4) which will support the lens in the absence of a socket. The clip 66 is shaped to engage the bottom of the barrel of the lens 14 and to engage at least part of each side of the barrel so as to steady the lens 14 and resist swinging movement of the camera-lens combination relative to the support 10. In the illustrated embodiment the clip 66 is of inverted channel shape having spaced apart legs 68 and a web 70. The end portions of the legs 68 frictionally engage the sides of the mounting plate 20. Steps 72 are provided intermediate the ends of the legs 68 and rest on top of the mounting plate 20. The web 70 is curved so as to present a concave surface for engagement with the periphery of the lens barrel. Differences in the diameters of various lens barrels will require the use of clips having the appropriate vertical dimension to engage the barrel.

The support 10 is put into use by placing the camera-lens combination on top of the support 10, with the camera 12 in engagement with the mounting plate and the lens barrel in engagement with the platform 40. Then the rear mounting 26 screw is screwed into the socket 30 in the camera 12, and the front mounting screw 28 is screwed into the socket 32 in the barrel of the lens 14, the screws 26, 28 being moved along the slots 36, 38 in either direction to permit alignment with the sockets 30, 32. Preferably the camera-lens combination will be disposed with its rear edge flush with the rear end of the mounting plate 20. When the screws 26, 28 are tightened, the camera 12 will be drawn down tightly against the mounting plate, and the barrel of the lens 14 will be drawn down tightly against the platform 40. There is thus no strain on the connection between the camera 12 and then lens 14, because the camera 12 and the lens 14 are independently and rigidly supported. Further, any tendency of the camera-lens combination to swing out of line with the support 10 is eliminated. The shutter release cable 48, in extending out the front of the stock portion 18, does not have to reach around the camera 12 from back-to-front or from back-to-top. Therefore, the cable 48 cannot come between the user's face and the back of the camera 12 so as to obstruct the viewfinder or interfere with the film-advancing mechanism. The operator aims the assembly in the manner of a pistol while grasping the handle 16 with one hand. The forward location of the trigger 42 in the stock portion 18 enables the operator to place his forefinger along the stock portion in a natural position to assist in steadying the assembly while adjusting the focus and aperture, while aiming the camera and while activating the shutter release mechanism. This feature is a distinct advantage over an arrangement in which the trigger is mounted in the handle. Two hands may be employed by placing the palm of the other hand under the butt with the thumb and forefinger gripping the stock portion 18. When the operator is ready to take a picture he pulls and then releases the trigger 42 in the usual manner of firing a pistol. Pulling of the trigger 42 forces the plunger 54 and core 52 of the cable 48 forwardly to actuate the shutter mechanism of the camera 12. When the trigger 42 is released, the spring 56 in the cable 48 returns the plunger 54, core 52 and trigger 42 to their rest positions.

When the barrel of the lens 14 has no socket the clip 66 is slipped over the top of the mounting plate 40 at a location such that the lens barrel will be drawn down tightly on the web 70 when the rear screw 26 is tightened.

While preferred embodiments of the present invention have been described, further modifications may be made without departing from the scope of the invention. Therefore, it is to be understood that the details set forth or shown in the drawings are to be interpreted in an illustrative, and not in a limiting sense, except as they appear in the appended claims.

What is claimed is:

1. A compact camera and lens support comprising: a unitary base member having a generally vertically extending handle adapted to be grasped in one hand in the manner of a pistol grip and a stock extending forwardly from the upper end of said handle, said stock defining longitudinally extending cavity means laterally open on both sides of said stock; a support plate secured to the upper surface of said stock over said cavity means; a pair of thumb screws in said cavity means, each of said thumb screws having a shank extending upwardly through a longitudinal slot in said support plate and having an enlarged head the diameter of which is less than the horizontal thickness of said stock, said cavity means being recessed into said stock at the ends of said cavity means to partially receive one of the screw heads so as to permit greater longitudinal movement of said screws and the periphery of said cavity means being bevelled along its outer edges on both sides of said stock so as to provide enlarged lateral openings which permit ready access to said screw heads by the operator's fingers; a pivoted trigger depending from said stock at a location forward of said handle; a shutter release cable having a sheath, an axially movable core, a plunger at one end for moving said core in a shutter actuating direction and a spring for moving said core in an opposite direction when said plunger is released; and means mounting the plunger end of said cable within said stock forwardly of said trigger so as to be operated thereby, the remainder of said cable projecting through said stock and being of sufficient length the be looped rearwardly for attachment to the shutter mechanism of the camera.

2. A camera and lens support as in claim 1 wherein said mounting plate includes platform means on its upper surface at the location of one of said cavities, the upper surface of said platform means being disposed above the level of the adjacent portions of the remainder of said mounting plate.

3. A camera and lens support as in claim 2 wherein the upper surface of said mounting plate is provided with a recess at the location of the rear cavity for receiving a protrusion on the bottom of a camera and thereby permitting the camera to engage said mounting plate.

4. A camera and lens support as in claim 1 wherein said stock is of integral, one-piece construction contoured to define said recessed cavity and said bevelled edges and wherein said support plate is a flat horizontal plate extending across the top of said cavity.

5. A camera and lens support as in claim 1 wherein said plunger end of said cable is of enlarged diameter relative to the remainder of said cable and wherein said stock defines a rearwardly-facing socket for retaining said plunger is directly contacted by said trigger upon pivotal movement of the latter by the operator, said stock further defining a passage of reduced diameter extending from the forward end of said socket to the outside of said stock for conducting said cable sheath.

References Cited

UNITED STATES PATENTS

| | | | |
|---|---|---|---|
| 1,621,903 | 3/1927 | Rossiter | 95—86 X |
| 2,427,593 | 9/1947 | Etzel | 95—86 |
| 2,746,369 | 5/1956 | Beard | 95—86 |
| 2,827,841 | 3/1958 | Scarpelli | 95—86 |

JOHN M. HORAN, Primary Examiner

U.S. Cl. X.R.

352—95